United States Patent
Hamel et al.

(10) Patent No.: US 11,263,098 B2
(45) Date of Patent: Mar. 1, 2022

(54) DATABASE SEGMENT LOAD BALANCER

(71) Applicant: Pivotal Software, Inc., San Francisco, CA (US)

(72) Inventors: Lawrence Hamel, Menlo Park, CA (US); Oz Basarir, San Francisco, CA (US); Goutam Tadi, Sunnyvale, CA (US); Ivan D. Novick, Sunnyvale, CA (US)

(73) Assignee: Pivotal Software, Inc., San Francisco, CA (US)

( * ) Notice: Subject to any disclaimer, the term of this patent is extended or adjusted under 35 U.S.C. 154(b) by 33 days.

(21) Appl. No.: 16/025,961

(22) Filed: Jul. 2, 2018

(65) Prior Publication Data
US 2020/0004651 A1 Jan. 2, 2020

(51) Int. Cl.
*G06F 11/00* (2006.01)
*G06F 11/20* (2006.01)
(Continued)

(52) U.S. Cl.
CPC .... *G06F 11/2094* (2013.01); *G06F 16/24532* (2019.01); *G06F 16/27* (2019.01);
(Continued)

(58) Field of Classification Search
CPC .. G06F 11/1088; G06F 11/1096; G06F 11/16; G06F 11/1612; G06F 11/1658;
(Continued)

(56) References Cited

U.S. PATENT DOCUMENTS 5,835,755 A 11/1998 Stellwagen, Jr.
7,599,923 B2 10/2009 Brown et al.
(Continued)

FOREIGN PATENT DOCUMENTS

WO WO2017062288 4/2017

OTHER PUBLICATIONS

Park et al. "Segment-Based Approach for Subsequence Searches in Sequence Databases", 2001 (Year: 2001).*
(Continued)

*Primary Examiner* — Sarai E Butler
(74) *Attorney, Agent, or Firm* — Fish & Richardson P.C.

(57) ABSTRACT

Methods, systems, and computer programs encoded on computer storage media, for implementing MPP relational databases using containers. One example system initiates primary containers to implement database segment instances. Each segment of the database is stored on a respective storage volume. Each storage volume is mounted on a respective primary container. The system detects a failure of a first primary container that is a segment instance of a first database segment. In response to the detection, the system performs a recovery process. The system unmounts, from the failed first primary container, a first storage volume storing the first database segment. The system selects a standby container from a pool of standby containers and mounts the first storage volume on the selected standby container. The system is reconfigured so that it processes queries for the first database segment using the selected standby container instead of the failed first container.

23 Claims, 3 Drawing Sheets

(51) Int. Cl.
*G06F 16/27* (2019.01)
*G06F 16/28* (2019.01)
*G06F 16/2453* (2019.01)

(52) U.S. Cl.
CPC ........ *G06F 16/284* (2019.01); *G06F 2201/80* (2013.01); *G06F 2201/82* (2013.01)

(58) Field of Classification Search
CPC .. G06F 11/1666; G06F 11/20; G06F 11/2094; G06F 11/1662; G06F 11/2066; G06F 11/2069; G06F 11/3433; G06F 11/2023; G06F 16/24532; G06F 16/24; G06F 16/284; G06F 2201/80; G06F 2201/82
USPC ................................................ 714/6.3, 1–57
See application file for complete search history.

(56) References Cited

U.S. PATENT DOCUMENTS

| | | | |
|---|---|---|---|
| 7,779,008 | B2 | 8/2010 | Dageville et al. |
| 8,898,407 | B1* | 11/2014 | Balasubramanian .................... G06F 11/1453 711/161 |
| 9,218,251 | B1* | 12/2015 | Hemashekar ....... G06F 11/1458 |
| 9,256,467 | B1 | 2/2016 | Singh et al. |
| 9,304,868 | B2 | 4/2016 | Isaacson et al. |
| 10,225,208 | B1 | 3/2019 | Prahlad et al. |
| 10,469,574 | B1* | 11/2019 | Dai ..................... G06F 9/45558 |
| 2002/0049759 | A1 | 4/2002 | Christensen |
| 2006/0080315 | A1 | 4/2006 | Mitchell |
| 2009/0300419 | A1* | 12/2009 | Silverman ........... G06F 11/2294 714/30 |
| 2010/0122248 | A1* | 5/2010 | Robinson ................ G06F 9/485 718/1 |
| 2011/0099147 | A1* | 4/2011 | McAlister ........... G06F 11/2076 707/639 |
| 2011/0099420 | A1* | 4/2011 | MacDonald McAlister ................ G06F 16/178 714/6.32 |
| 2012/0311580 | A1* | 12/2012 | Emelianov ............ G06F 16/119 718/100 |
| 2014/0298077 | A1 | 10/2014 | Isaacson et al. |
| 2014/0337664 | A1* | 11/2014 | Gokhale ............. G06F 11/1464 714/6.3 |
| 2015/0212760 | A1* | 7/2015 | Goel ..................... G06F 3/0689 714/6.3 |
| 2017/0093923 | A1 | 3/2017 | Duan |
| 2017/0214550 | A1* | 7/2017 | Kumar ................ H04L 41/0654 |
| 2017/0241550 | A1* | 8/2017 | Sabotta ............. F02M 63/0028 |
| 2017/0242617 | A1 | 8/2017 | Waslh et al. |
| 2017/0344289 | A1* | 11/2017 | Jeong ..................... G06F 16/188 |
| 2017/0364423 | A1* | 12/2017 | Peng .................. G06F 11/2025 |
| 2018/0024537 | A1* | 1/2018 | Chauvet ............. G06F 11/3495 718/104 |
| 2018/0121511 | A1* | 5/2018 | Li ........................ G06F 16/2365 |
| 2018/0192327 | A1* | 7/2018 | Gaydos ................ H04W 28/08 |
| 2018/0329757 | A1* | 11/2018 | Patgar ................ G06F 9/45558 |
| 2019/0102265 | A1* | 4/2019 | Ngo ..................... H04L 41/0803 |
| 2019/0306022 | A1* | 10/2019 | Shimoga Manjunatha ................ H04L 41/0813 |

OTHER PUBLICATIONS

PCT International Search Report and Written Opinion issued in International Application No. PCT/US2019/039832 dated Sep. 30, 2019, 15 pages.

* cited by examiner

DATABASE SEGMENT LOAD BALANCER

BACKGROUND

This specification relates to massively parallel processing (MPP) relational databases.

Relational databases organize data into tables of columns and rows. A unique key identifies each row in each table. A particular row represents an instance of a particular entity, and the columns in that row store values attributed to the instance. Rows in one table can be linked to rows in another table by including in one of the two tables a column for the unique key of the linked row.

An MPP database is a database that is partitioned into multiple segments called database segments. Physical or virtual segment hosts execute computer programs called segment instances that process queries of respective database segments. Each segment host has its own storage and processing power. Each segment instance, at the direction of a master host, can execute a portion of a query from a client device. The master collects the results from each segment instance and returns a final result to the client device.

Generally, each segment of an MPP database is supported by a primary segment host, e.g., a first physical disk or server, and a mirror segment host, e.g., a second physical disk or server. The mirror segment hosts provide redundancy in case of a failure of one or more primary segment hosts. However, this configuration requires a significant amount of physical storage space. Additionally, upon the failure of a primary segment host, the MPP database must be physically reconfigured to refer to the corresponding mirror segment host. This physical reconfiguration can be slow and causes downtime during which the MPP database is unavailable.

SUMMARY

This specification describes a system that can implement MPP relational databases using containers. In this specification, containers refer to isolated user-space instances that are implemented by operating-system-level virtualization. Containers share computing resources, e.g., memory or processing power, of their respective computing systems. Computing systems can dynamically adjust resource allocation between containers as necessary. In the system described herein, one or more containers serve as segment hosts for an MPP relational database. The containers can be connected to a database master directly or through load balancers.

The system can store each database segment in a respective storage volume. In particular, each database segment resides in a highly-available redundant array of independent disks ("RAID array") that is presented as a single storage volume. The use of RAID arrays for storing database segments eliminates the need to store replicas of each database segment because RAID arrays provide redundancy. The system mounts each storage volume in a respective primary container that executes a segment instance for the database segment.

If a primary container fails, the system can unmount the storage volume storing the database segment for that container and mount that storage volume to a standby container. In this context, the term "standby container" means a container that is initialized and ready to assume the role of any primary segment host that should happen to fail. Being a standby container does not imply that the container stores a mirrored version of a dataset. The system can then initialize the standby container to implement the segment instance for the database segment. This sequence of events can be accomplished quickly because the failed container and standby container communicate over a fast network layer.

Finally, the system can reconfigure the database so that queries of the database segment use the newly initialized standby container instead of the failed primary container. In implementations in which the containers are directly connected to the database master, the system reconfigures the database master. In implementations in which each primary container instead has a load balancer, the system reconfigures the load balancer.

The subject matter described in this specification can be implemented in particular embodiments so as to realize one or more of the following advantages. Eliminating database segment replicas reduces the number of physical servers and computing resources needed to implement an MPP relational database, which reduces the costs of operating the database. Eliminating database segment replicas also reduces network traffic and CPU usage, improving the efficiency of the MPP relational database.

By implementing a single segment instance per container, the database experiences reduced performance degradation when a primary container hosted on a particular physical computer fails because other physical computers do not have to handle a larger database load. Instead, the system replaces the failed primary container with a standby container and destroys the failed primary container. Thereafter, the system can allocate additional computing resources to the standby container if necessary. Because physical computers do not have to handle a larger database load, there is no speed degradation.

Rebalancing of physical computers is also not required. Instead, as mentioned above, the system merely replaces a failed primary container with a standby container that assumes the same role. The standby container shares computing resources with other primary containers in the database system. Because rebalancing is not required, database downtime is reduced, and availability is improved.

Finally, the system can perform the recovery process more quickly than normal because the system transfers the storage volume of a failed primary container to a standby container over a fast network layer rather than over a slow physical layer.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
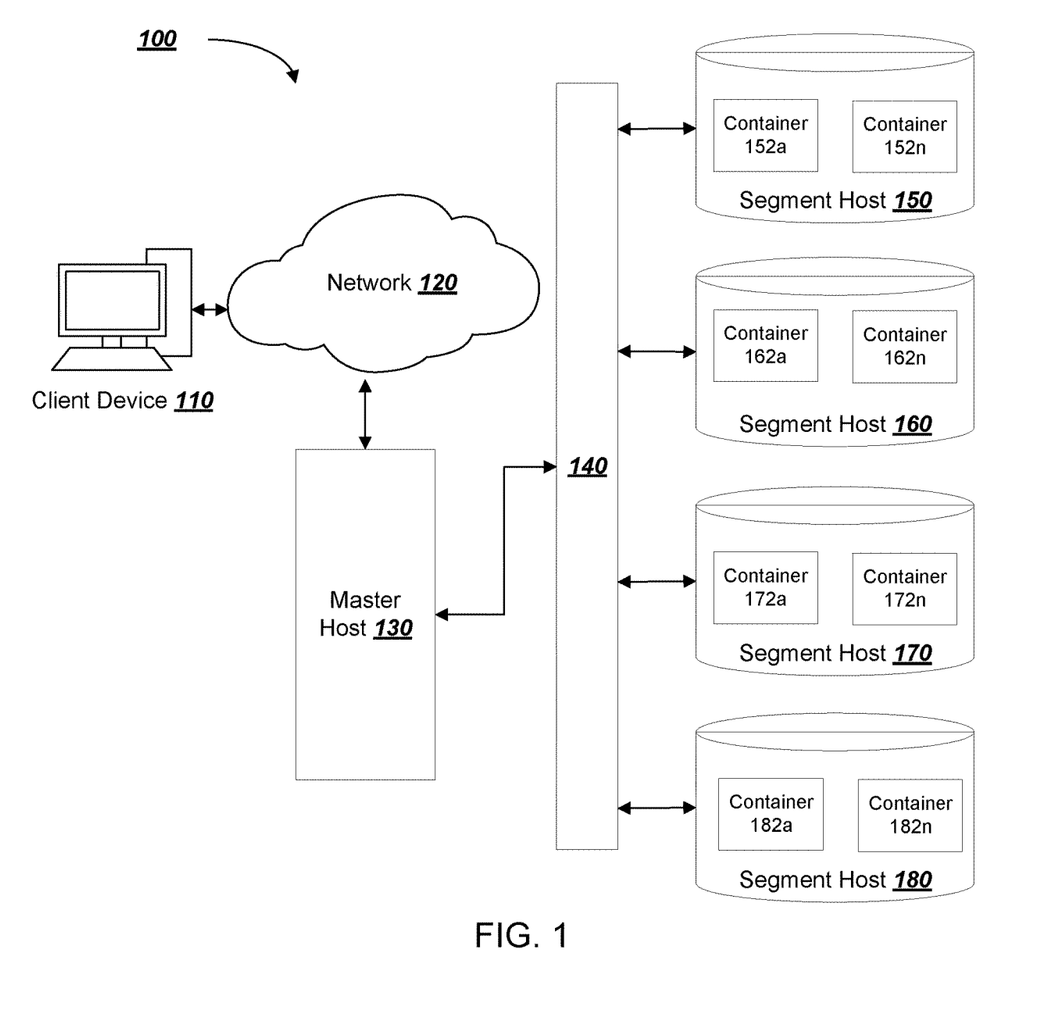
FIG. 1 is a diagram of an example system.

FIG. 1 is a diagram of an example system 100 in which a client device and an MPP relational database communicate and exchange information over a network.

The client device 110 can be a server, a desktop computer, a laptop computer, a tablet, a mobile device, or another similar computing device. Although only a single client device is depicted in FIG. 1, the system can support many client devices operating anywhere in the world.

The client device connects to a master host 130 over a network 120. The network can be any appropriate combination of communication networks. For example, the network can be a local area network (LAN) that connects computers in a limited area such a residence, school, laboratory, or office building. LANs include Ethernet and Wi-Fi networks. The network can also be a larger network, including a wide area network (WAN) or the Internet.

The master host is one or more computers in one or more locations that control a number of segment instances. The master host includes a global database catalog that can store information about all of the tables in the MPP relational database and the distribution policy of each table. In other words, the global database catalog can store information about how the tables in the MPP relational database are distributed among segment hosts. The global database catalog can be a hash table, search tree, or other similar table lookup structure.

Segment hosts 150-180 are connected to the master host through a switch 140. Generally, each segment host is a computing resource, e.g., physical computer or virtual machine, that hosts one or more containers. In some implementations, each segment host is virtual machine running on a particular physical computer. Segment host 150 hosts containers 152a-152n, segment host 160 hosts containers 162a-162n, and so on. Each container executes segment instances of the MPP relational database.

Containers are isolated user-space instances that are implemented by operating-system-level virtualization. Containers share computing resources, e.g., memory or processing power, of their respective segment host. The operating system of each segment host can dynamically adjust resource allocation between containers as necessary. In some implementations, the containers are connected to the database master directly. In other implementations, the containers are connected to the database master through load balancers.

The Linux kernel "cgroups" can be used to control resource allocation between the containers. Cgroups provides resource limiting, prioritization, accounting, and control functionality. Resource limiting involves specifying that particular containers cannot exceed a configured memory limit. Prioritization involves specifying that particular containers are allocated a larger share of central processing unit (CPU) utilization. Accounting involves measuring the resource usage of a container. And control involves freezing processes performed by a container.

The client device can query the MPP relational database to retrieve particular data from it. In response to a query, the master host creates a distributed query plan that is sent to all segment hosts and executed in parallel. A result is returned to the master host, which provides the result to the client device.

Figure 2:
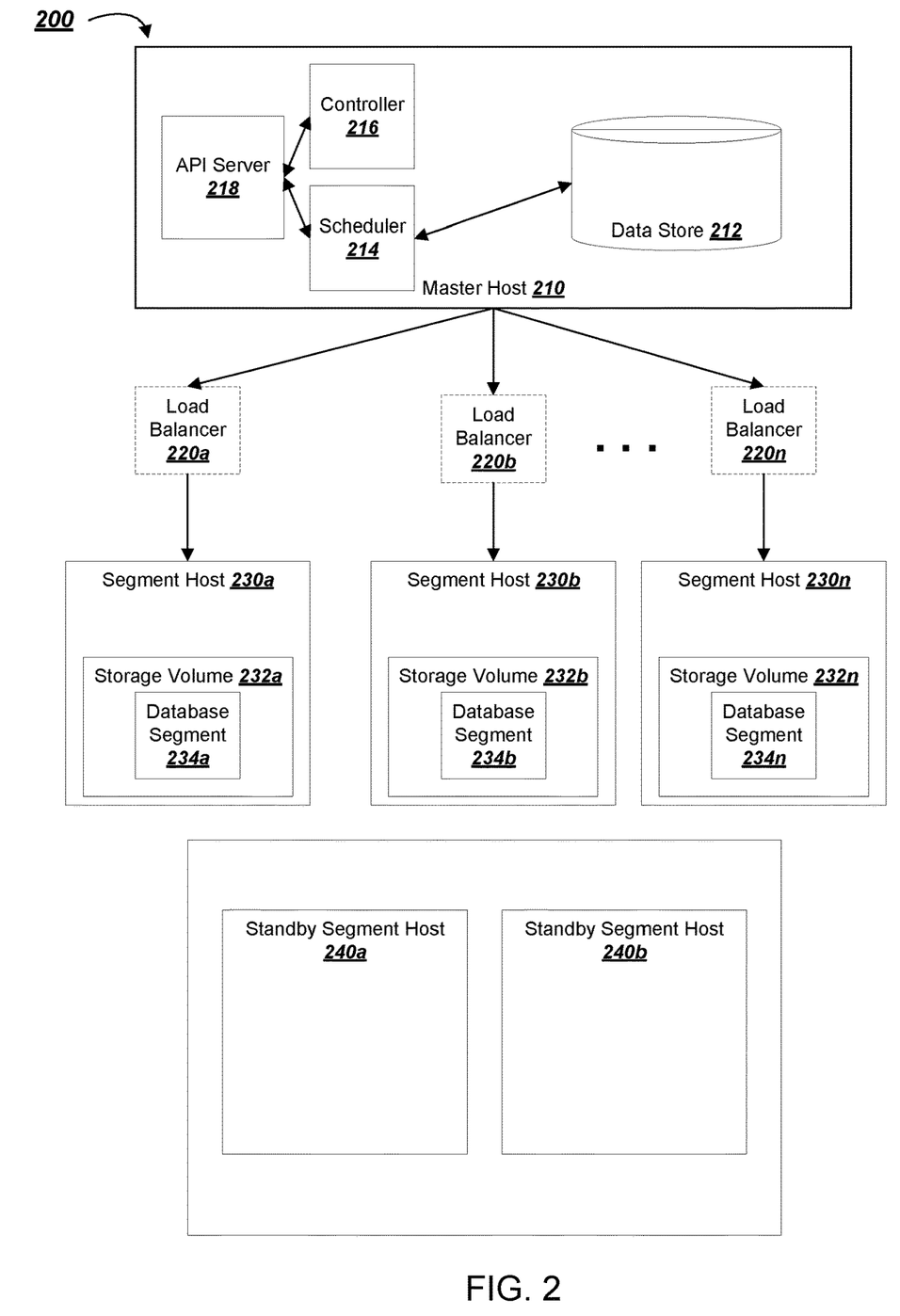
FIG. 2 is a diagram of an example architecture of an MPP relational database.

FIG. 2 depicts an example architecture 200 of an MPP relational database.

The architecture includes a master host 210. The master host has a data store 212. The data store can store the configuration of database data in segment hosts 230a-230n of the MPP relational database. In other words, the data store specifies which segment hosts store which database segments. Changes in the data store correspond to changes in the configuration of data in the segment hosts. For example, certain segment instances might be exchanged between segment hosts. Such a change would be reflected in the data store. The data store can be a hash table, search tree, or other similar table lookup structure.

The master host also includes a scheduler 214. The scheduler can select segment hosts to host unscheduled segment instances. The scheduler can also select standby hosts to host segment instances that were previously hosted by failed segments hosts.

The scheduler can track resource utilization on each segment host to ensure that workload is not scheduled in excess of available computing resources. For this purpose, the scheduler must know the resource requirements, resource availability and a variety of other user-provided constraints and policy directives. In essence, the scheduler can match resource supply to workload demand. The scheduler is configured to communicate with and update the data store when it selects a segment host in which to implement an unscheduled segment instance.

The scheduler can also select resource allocations for the segment hosts based on policy directives. For example, a policy directive might specify that primary segment hosts should be allocated more computing resources than standby segment hosts. The scheduler can decide how to allocate resources to carry out the policy directive.

The master host also includes a controller 216 that can communicate with the segment hosts through an API server 218 to create, update, and delete the resources it manages. That is, the controller can carry out the resource allocation decisions made by the scheduler. The API server provides both internal and external interface to architecture 200.

As mentioned above, the architecture 200 also includes a number of segment hosts, including segment hosts 230a-230n. Each segment host is computing resource, e.g., a physical computer, a virtual machine, or a container. Generally, each segment host is a physical computer that hosts multiple containers.

In the example architecture 200, each container can implement a single segment instance. When the master host receives a query from a client device, it creates a distributed query plan that is sent to all segment hosts and executed in parallel by the segment instances. The segment hosts ultimately returns results to the master host, which aggregates those results and provides them to the client device.

One or more storage volumes in each segment host, e.g., a storage volume 232a in the segment host 230a, can each store a database segment, e.g., a database segment 234a. A database segment is a portion of the data of the MPP relational database. Execution of a database segment's corresponding segment instance causes the database segment to be queried. Each storage volume can be a RAID array that provides high-availability storage. RAID arrays are made of multiple independent storage disks that provide some combination of read and/or write speed, redundancy, and increased storage space. "RAID 5," for example, stripes data between three or more disk drives and distributes "parity data," which provides redundancy, equally among the three or more disks. Because data is stored in parallel, read and write speed is faster. The parity data ensures that all data can be recovered even if one disk fails, and storing parity data requires less memory space than storing a complete copy of the original data for redundancy purposes. Although each database segment is actually stored on multiple physical disks, the storage volume appears to be a single storage volume to the container to which the storage volume is mounted.

The architecture 200 optionally includes one or more load balancers 220a-220n. The load balancers are proxies that can be used to shift database workloads from one container to another. The load balancers, if present, provide a layer of indirection that enables segments hosts to be changed without informing and reconfiguring the master, which reduces downtime due to container failures. The load balancers route queries from the master to a container, and return results to the master.

The load balancers can also be configured to provide retry functionality. That is, a load balancer for a particular primary container can reroute a query to a standby container that replaces a failed primary container after the load balancer is reconfigured to point to that standby container. This process can be performed without client knowledge so that a failed query actually appears to be a slow query.

The architecture also includes one or more standby segment hosts, e.g., standby segment hosts 240a and 240b. If a primary segment host fails, that segment host's storage volume can be unmounted and mounted to one of the standby containers. Thereafter, the master host is reconfigured so that the master processes queries for the database segment using the selected standby container instead of the failed primary container. If the architecture includes load balancers, the load balancer for the failed segment host can instead be reconfigured to point to the selected standby segment host.

Figure 3:
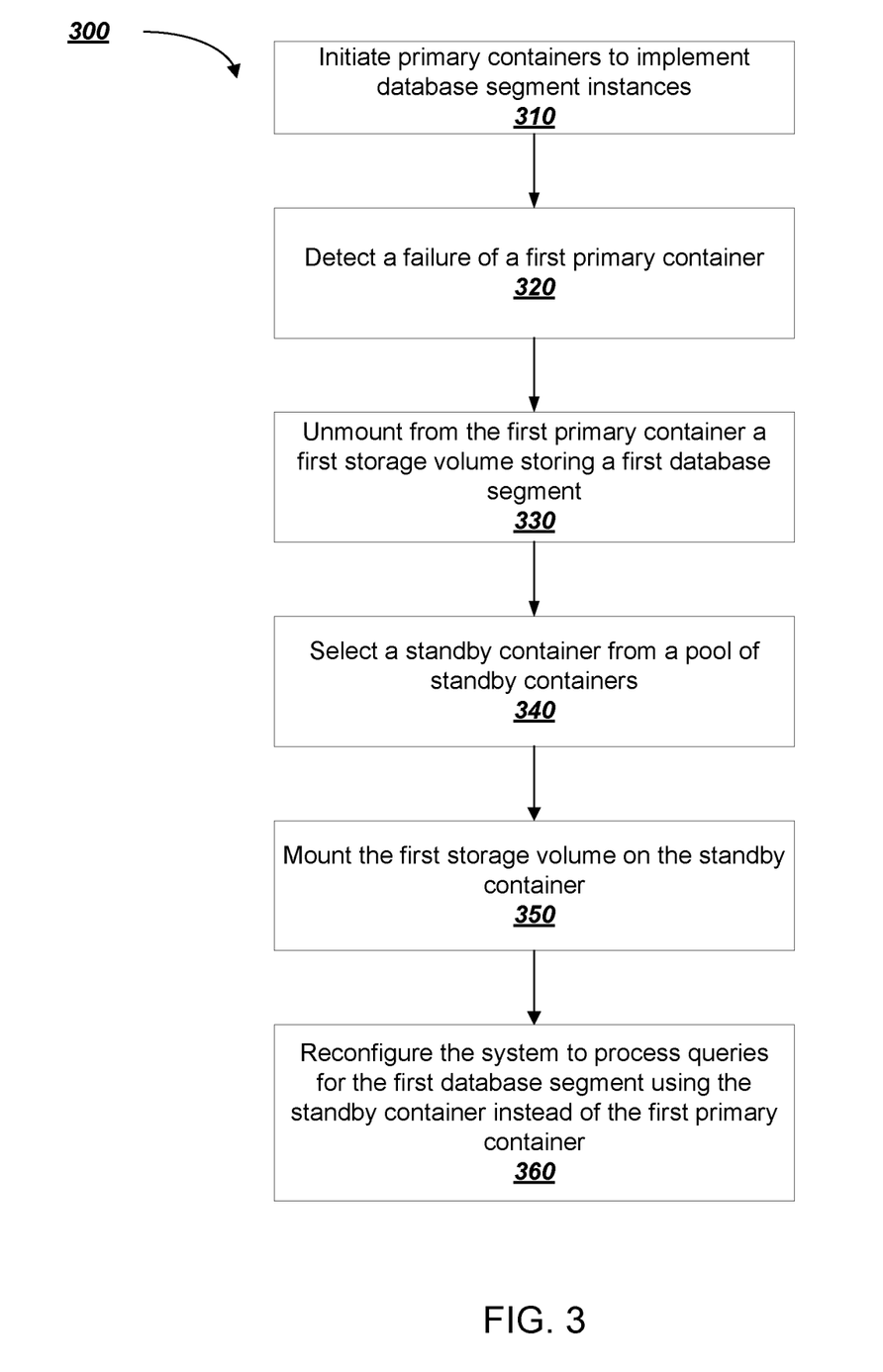
FIG. 3 is a flow chart of an example recovery process performed by an MPP relational database.

FIG. 3 is a flow chart of an example recovery process 300. The recovery process can be performed by or at the direction of one or more components of a database system. For example, the recovery process can be performed by the database master 210 of FIG. 2. For convenience, the recovery process 300 will be described as being performed by a system of one or more computers in one or more locations.

The system initiates a number of primary containers to implement segment instances of a database (310). Each segment instance is a computer program that processes queries for a respective database segment, i.e., a portion of data, of an MPP relational database. The containers can be hosted on one or more physical computers, e.g., servers. Containers hosted on a particular physical computer share that computer's computing resources, e.g., memory, processing power, etc. The physical computer can allocate and reallocate computing resources among the containers as necessary.

The system can mount to each container a storage volume for storing database segments. In some implementations, the storage volumes are high-availability RAID arrays. In such implementations, each storage volume appears as a single disk drive that stores a particular database segment. But in reality, each storage volume is a high-availability RAID array. In such implementations, the system can "stripe" each database segment into multiple blocks. That is, the system can segment logically sequential data and can store consecutive segments on different physical storage devices. The system can also store parity data on each physical storage device. Parity data provides redundancy in case of a failure of one or more physical disks. Together, the striping and parity provide increased read and write speed and redundancy. Also, RAID arrays require less storage volume than simply duplicating all data, e.g., by using mirror database segments. The RAID array provides increased read and write speed because read and write operations are performed on all disk drives in parallel. The redundancy is a result of the parity data that is stored on each disk drive. And the reduced storage space is a consequence of the parity data taking up half as much space as a corresponding amount of duplicated original data. By using RAID arrays to store database segments, the system can ensure that each segment's storage is protected against the failure of a single hard drive.

The system detects a failure of a first primary container that implements a segment instance of a first database segment (320). Specifically, a fault probing routine executed by a master host can detect the failure.

In response to the detection of the failure, the system initiates a recovery process. The system unmounts the storage volume from the container (330). Unmounting a storage volume from a container revokes the container's read and write access to the storage volume.

The system selects a standby container from a pool of standby containers (340). The standby containers have a similar amount of computing resources as the primary containers, or can be adjusted to have a similar amount of computing resources. The pool of standby containers can have many fewer standby containers than there are primary containers. Limiting the number of standby containers reduces energy consumption and reduces the number of physical servers required to implement the database system. The system can also configure the standby containers to use fewer computing resources while waiting in the pool. This allows the system to allocate more computing resources to other primary containers after being promoted to be primary containers.

The system mounts the unmounted storage volume to the standby container (350). Mounting a storage volume involves making the storage volume available to the container, i.e., providing read and write access to the container. The container requires read and write access to the storage volume so that the segment instance implemented by the container can process queries of the database segment. The unmounting of the storage volume from the primary container and the mounting of the storage volume to the standby container can be accomplished quickly because these processes are mediated by a fast network layer. That is, the data in the storage volume is transferred via a network layer from one container to another and not via a slower physical layer from one computer to another. Quick unmounting and mounting of storage volumes reduces database downtime, which is advantageous to clients that wish to query the database.

The system reconfigures itself so that it processes queries for the first database segment using the selected standby container instead of the failed first primary container (360). In some implementations, this involves reconfiguring the master host itself. For example, the data store 212 of FIG. 2 can be rewritten. In some implementations, each segment host has a load balancer. In such implementations, the master host itself need not be reconfigured. Instead, the system can reconfigure the load balancer that previously pointed to the failed primary container to point to the standby container.

The system can also initiate a new standby container in the pool of standby containers to take the place of the promoted standby container.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method performed by a database system, the method comprising:

initiating a plurality of primary containers to implement a respective database segment instance, wherein each segment of the database is stored on a respective storage volume of a plurality of storage volumes, and wherein each storage volume of the plurality of storage volumes is mounted on a respective primary container of the plurality of primary containers;

detecting a failure of a first primary container of the plurality of primary containers that is a segment instance of a first database segment; and in response to the detection, performing a recovery process, including:
unmounting, from the failed first primary container, a first storage volume storing the first database segment,
selecting a standby container from a pool of standby containers;
mounting the first storage volume on the selected standby container, and
reconfiguring the system so that the system processes queries for the first database segment using the selected standby container instead of the failed first container.

Embodiment 2 is the method of embodiment 1, wherein reconfiguring the system comprises directing a master to process queries for the first database segment by communicating with the selected standby container instead of the failed first container.

Embodiment 3 is the method of embodiment 1, wherein a master processes queries by communicating through a respective load balancer for each segment of the plurality of database segments, and
wherein reconfiguring the system comprises directing a first load balancer for the first database segment to direct queries to the selected standby container instead of the failed first container.

Embodiment 4 is the method of any one of embodiments 1-3, wherein an amount of primary containers in the plurality of primary containers is equal to an amount of storage volumes in the plurality of storage volumes, and wherein each storage volume is mounted in a single primary container.

Embodiment 5 is the method of any one of embodiments 1-4, wherein an amount of standby containers in the pool of standby containers is less than an amount of primary containers in the plurality of primary containers.

Embodiment 6 is the method of any one of embodiments 1-5, wherein each of the plurality of storage volumes comprises a redundant array of independent disks.

Embodiment 7 is the method of any one of embodiments 1-6, wherein the operations further comprise:
adding a new standby container to the standby container pool.

Embodiment 8 is the method of any one of embodiments 1-7, wherein each of the standby containers is allocated a similar amount of computing resources as each of the plurality of primary containers.

Embodiment 9 is the method of any one of embodiments 1-8, wherein unmounting, from the failed container, the storage volume, and mounting the storage volume in the standby container comprises transferring data identifying the storage volume over a network layer from the failed container to the standby container.

Embodiment 10 is a system comprising: one or more computers and one or more storage devices storing instructions that are operable, when executed by the one or more computers, to cause the one or more computers to perform the method of any one of embodiments 1-9.

Embodiment 11 is one or more computer-readable storage media storing instructions, that when executed by one or more computers of a database system, cause the one or more computers to perform the method of any one of embodiments 1-9.

While this specification contains many specific implementation details, these should not be construed as limitations on the scope of any invention or on the scope of what is being or may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system comprising:
one or more computers and one or more storage devices storing instructions that are operable, when executed by the one or more computers, to cause the one or more computers to perform operations comprising:
initiating a plurality of primary containers, wherein each primary container implements a respective database segment instance of a distributed database, wherein each database segment instance is configured to process queries for a respective database segment, and wherein each primary container is assigned to a respective database segment that is stored on a respective storage volume of a plurality of storage volumes, and wherein each storage volume of the plurality of storage volumes is mounted on a respective primary container of the plurality of primary containers;

initiating a plurality of standby containers that are each configured to implement a respective database segment instance for the database when a database segment previously assigned to a primary container is reassigned to the standby container;

detecting a failure of a first primary container of the plurality of primary containers that implements a first database segment instance of a first database segment; and in response to the detection, performing a recovery process that switches the assignment of the first database segment from the failed first primary container to a first standby container of the plurality of standby containers, wherein the recovery process comprises:

unmounting, from the failed first primary container, a first storage volume storing the first database segment, mounting the first storage volume, that was unmounted from the first primary container, on the first standby container, and reconfiguring the system so that the system processes queries for the first database segment using the first standby container implementing the first database segment stored on the first storage volume instead of the failed first primary container.

2. The system of claim 1, wherein reconfiguring the system comprises assigning the first standby container to process queries for the first database segment by communicating with the first standby container instead of with the failed first primary container.

3. The system of claim 1, wherein a master host processes queries by communicating through a respective load balancer for each segment of the plurality of database segments, and wherein reconfiguring the system comprises directing a first load balancer for the first database segment to direct queries to the first standby container instead of the failed first primary container.

4. The system of claim 1, wherein a count of primary containers in the plurality of primary containers is equal to a count of storage volumes in the plurality of storage volumes, and wherein each storage volume is mounted in a single primary container.

5. The system of claim 1, wherein a count of standby containers in the pool of standby containers is less than a count of primary containers in the plurality of primary containers.

6. The system of claim 1, wherein each of the plurality of storage volumes comprises a redundant array of independent disks.

7. The system of claim 1, wherein the operations further comprise:

adding a new standby container to the plurality of standby containers to replace the standby container of the plurality of standby containers.

8. The system of claim 1, wherein each of the plurality of standby containers is allocated a similar amount of computing resources as each of the plurality of primary containers.

9. The system of claim 1, wherein unmounting, from the failed first primary container, the storage volume, and mounting the storage volume in the first standby container comprises providing data identifying the storage volume over a network layer to the first standby container.

10. The system of claim 1, wherein performing the recovery process further comprises assigning the first standby container to process queries for data in the first database segment.

11. A method performed by a database system, the method comprising:

initiating a plurality of primary containers, wherein each primary container implements a respective database segment instance of a distributed database, wherein each database segment instance is configured to process queries for a respective database segment, and wherein each primary container is assigned to a respective database segment that is stored on a respective storage volume of a plurality of storage volumes, and wherein each storage volume of the plurality of storage volumes is mounted on a respective primary container of the plurality of primary containers;

initiating a plurality of standby containers that are each configured to implement a respective database segment instance for the database when a database segment previously assigned to a primary container is reassigned to the standby container;

detecting a failure of a first primary container of the plurality of primary containers that implements a first database segment instance of a first database segment; and in response to the detection, performing a recovery process that switches the assignment of the first database segment from the failed first primary container to a first standby container of the plurality of standby containers, wherein the recovery process comprises:

unmounting, from the failed first primary container, a first storage volume storing the first database segment, mounting the first storage volume, that was unmounted from the first primary container, on the first standby container, and reconfiguring the system so that the system processes queries for the first database segment using the first standby container implementing the first database segment stored on the first storage volume instead of the failed first primary container.

12. The method of claim 11, wherein reconfiguring the system comprises assigning the first standby container to process queries for the first database segment by communicating with the first standby container instead of the failed first primary container.

13. The method of claim 11, wherein a master host processes queries by communicating through a respective load balancer for each segment of the plurality of database segments, and wherein reconfiguring the system comprises directing a first load balancer for the first database segment to direct queries to the first standby container instead of the failed first primary container.

14. The method of claim 11, wherein a count of primary containers in the plurality of primary containers is equal to a count of storage volumes in the plurality of storage volumes, and wherein each storage volume is mounted in a single primary container.

15. The method of claim 11, wherein a count of standby containers in the pool of standby containers is less than a count of primary containers in the plurality of primary containers.

16. The method of claim 11, wherein each of the plurality of storage volumes comprises a redundant array of independent disks.

17. The method of claim 11, wherein the operations further comprise:
adding a new standby container to the plurality of standby containers to replace the standby container of the plurality of standby containers.

18. The method of claim 11, wherein each of the plurality of standby containers is allocated a similar amount of computing resources as each of the plurality of primary containers.

19. The method of claim 11, wherein unmounting, from the failed first primary container, the storage volume, and mounting the storage volume in the first standby container comprises providing data identifying the storage volume over a network layer to the first standby container.

20. The method of claim 11, wherein performing the recovery process further comprises assigning the first standby container to process queries for data in the first database segment.

21. One or more non-transitory computer-readable storage media storing instructions, that when executed by one or more computers of a database system, cause the one or more computers to perform operations comprising:
initiating a plurality of primary containers, wherein each primary container implements a respective database segment instance of a distributed database, wherein each database segment instance is configured to process queries for a respective database segment, and wherein each primary container is assigned to a respective database segment is stored on a respective storage volume of a plurality of storage volumes, and wherein each storage volume of the plurality of storage volumes is mounted on a respective primary container of the plurality of primary containers;
initiating a plurality of standby containers that are each configured to implement a respective database segment instance for the database when a database segment previously assigned to a primary container is reassigned to the standby container;
detecting a failure of a first primary container of the plurality of primary containers that implements a first database segment instance of a first database segment; and
in response to the detection, performing a recovery process that switches the assignment of the first database segment from the failed first primary container to a first standby container of the plurality of standby containers, wherein the recovery process comprises:
unmounting, from the failed first primary container, a first storage volume storing the first database segment,
mounting the first storage volume, that was unmounted from the first primary container, on the first standby container, and
reconfiguring the system so that the system processes queries for the first database segment using the first standby container implementing the first database segment stored on the first storage volume instead of the failed first primary container.

22. The one or more non-transitory computer-readable storage media of claim 21, wherein a master host processes queries by communicating through a respective load balancer for each segment of the plurality of database segments, and
wherein reconfiguring the system comprises directing a first load balancer for the first database segment to direct queries to the first standby container instead of the failed first primary container.

23. The one or more non-transitory computer-readable storage media of claim 21, wherein performing the recovery process further comprises assigning the first standby container to process queries for data in the first database segment.

* * * * *